(12) United States Patent
Song et al.

(10) Patent No.: US 11,505,907 B2
(45) Date of Patent: Nov. 22, 2022

(54) METHOD FOR REGULATING AND CONTROLLING DISCHARGE FLOW OF DAMMED LAKE

(71) Applicant: Institute of Mountain Hazards and Environment, Chinese Academy of Sciences, Sichuan (CN)

(72) Inventors: Dongri Song, Sichuan (CN); Xiaoqing Chen, Sichuan (CN); Gongdan Zhou, Sichuan (CN); Hao Jiang, Sichuan (CN); Yitong Bai, Sichuan (CN)

(73) Assignee: Institute of Mountain Hazards and Environment, Chinese Academy of Sciences, Sichuan (CN)

( * ) Notice: Subject to any disclaimer, the term of this patent is extended or adjusted under 35 U.S.C. 154(b) by 239 days.

(21) Appl. No.: 16/893,403

(22) Filed: Jun. 4, 2020

(65) Prior Publication Data
US 2020/0308788 A1 Oct. 1, 2020

(30) Foreign Application Priority Data
Mar. 6, 2020 (CN) .......................... 202010152301.1

(51) Int. Cl.
*E02B 3/02* (2006.01)
*E02B 5/08* (2006.01)
*E02B 5/02* (2006.01)

(52) U.S. Cl.
CPC .................. *E02B 3/02* (2013.01); *E02B 5/02* (2013.01); *E02B 5/085* (2013.01)

(58) Field of Classification Search
CPC ..... E02B 3/02; E02B 3/04; E02B 3/12; E02B 5/02
See application file for complete search history.

(56) References Cited

U.S. PATENT DOCUMENTS 3,161,026 A * 12/1964 Smedley ................... E02B 3/02
405/35

FOREIGN PATENT DOCUMENTS

KR 100554867 * 2/2006

* cited by examiner

*Primary Examiner* — Sean D Andrish

(57) ABSTRACT

ABSTRACT OF THE DISCLOSURE
A method for regulating and controlling discharge flow of a dammed lake includes steps of: (S1) estimating a most dangerous discharge condition; (S2) based on the most dangerous discharge condition, calculating a structural internal force of the steel flexible net; (S3) based on the internal force of the steel flexible net, calculating an anti-slide embedded depth at two sides of the steel flexible net; (S4) based on the most dangerous discharge condition, manually excavating a channel; and (S5) based on the anti-slide embedded depth at the two sides of the steel flexible net, embedding the steel flexible net into a barrier dam. According to the present invention, the steel flexible net is laid on the upstream slope of the barrier dam, two sides of the steel flexible net is embedded into the slope body with gravels of the barrier dam, and cooperates with the channel for usage.

10 Claims, 2 Drawing Sheets

II-II

METHOD FOR REGULATING AND CONTROLLING DISCHARGE FLOW OF DAMMED LAKE

CROSS REFERENCE OF RELATED APPLICATION

The present invention claims priority under 35 U.S.C. 119(a-d) to CN 202010152301.1, filed Mar. 6, 2020.

BACKGROUND OF THE PRESENT INVENTION

Field of Invention

The present invention relates to a disposal technology of dammed lakes, and more particularly to a method for regulating and controlling discharge flow of a dammed lake with a steel flexible net.

Description of Related Arts

The formation and breach of dammed lakes are natural geological processes. The barrier dam may form from landslide and debris avalanche blocking the mountainous river, and glacier till intercepting glacial meltwater. A barrier dam blocks the originally continuous flowing valley water into a dammed lake with high potential energy, whose breaching process often causes extreme flood events. As a result, it has a very adverse effect on the production and lives of downstream residents, the construction and operation of water conservancy and hydropower facilities. In general, the processes from the formation and breaching of a dammed lake to the outburst flood downstream is called as a hazard chain. The impact of the hazard chain is often much greater than a single hazard event. Therefore, the emergency disposal technology for dammed lakes has become a difficult problem urgently needed to be overcome in emergency hazard relief.

The basic method of emergency disposal of dammed lakes is to excavate a channel for effectively reducing the water level and volume of dammed lakes. In the breaching process of a dammed lake, the soil and gravels of the channel on the barrier dam are scoured by the high-speed water flow, causing rapid undercut and lateral expansion of the channel. The undercut of channel in turn promotes the rapid growth of breaching discharge. This positive feedback between channel undercut and the increase of breaching discharge makes the breaching discharge grow rapidly in an uncontrollable manner. Therefore, the key to emergency disposal of dammed lakes is to cut off the positive feedback chain between channel undercut and the increase of breaching discharge.

At present, the existing methods for regulating the breaching discharge of dammed lakes include placing man-made structures in the channel to block the water flow, so as to control the undercut of the channel. However, emergency disposal often faces difficulties such as long preparation time for man-made structures and lack of suitable access roads to transport heavy man-made structures to barrier dams in valleys. Some solution prepares man-made structures using block stones of the barrier dams. However, the formation of barrier dams is often accompanied by strong fragmentation and abrasion. It is difficult to find block stones with diameter greater than 0.5 meter on site. Therefore, it is crucial for emergency disposal to use the light-weight general structure to implement discharge control.

On the other hand, during the breaching process of dammed lakes, the huge water level difference between upstream and downstream means that huge potential energy is converted into kinetic energy; the breaching flood has a high flow velocity and material entrainment capacity, so the placement of man-made structures in the channel faces the risk of being washed away by discharge flow. Therefore, the method of regulating and controlling the discharge flow of dammed lakes should be able to effectively control the conversion of the potential energy of the lake water into kinetic energy.

SUMMARY OF THE PRESENT INVENTION

The present invention aims to solve the problems that, in the existing methods for regulating and controlling discharge flow of a dammed lake, the regulating and controlling structure is difficult to be obtained and regulation effects are difficult to be predicted. Accordingly, the present invention provides a method for regulating and controlling discharge flow of a dammed lake, which comprises embedding two sides of a steel flexible net, which has light structure and is universal available, into an upstream slope of a barrier dam, and cooperating the steel flexible net with a manually excavated channel for regulating and controlling the discharge flow of the dammed lake.

The present invention provides a method for regulating and controlling discharge flow of a dammed lake with a steel flexible net, which comprises steps of:

(S1) estimating a most dangerous discharge condition;

(S2) based on the most dangerous discharge condition, calculating a structural internal force of the steel flexible net;

(S3) based on the structural internal force of the steel flexible net, calculating an anti-slide embedded depth at two sides of the steel flexible net;

(S4) based on the most dangerous discharge condition, manually excavating a channel; and (S5) based on the anti-slide embedded depth at the two sides of the steel flexible net, embedding the steel flexible net into a barrier dam.

Further, the step of (S1) comprises, in an absence of the steel flexible net, calculating a flood peak discharge when a barrier dam discharges, a cross section of the channel corresponding to the flood peak discharge, and a maximum cross section when the discharge diminishes.

Further, the step of (S2) comprises calculating a uniform pressure of the steel flexible net under hydrostatic condition, wherein the steel flexible net comprises a horizontal supporting rope group and multiple energy dissipating devices connected with the horizontal supporting rope group; calculating an arc length of an arc which is formed by the horizontal supporting rope group under the uniform pressure; according to a deformation of the energy dissipating devices, a width of the channel and the uniform pressure, calculating a radius of the arc; and according to the uniform pressure and the radius of the arc, calculating a tensile force of the horizontal supporting rope group.

Further, the step of (S3) comprises assuming the tensile force of the horizontal supporting rope group caused by water flow is further transferred to the two sides of the steel flexible net which are embedded into gravels, and reversing the anti-slide embedded depth.

Further, the step of (S4) comprises manually excavating the channel at a low-lying place of the barrier dam, for ensuring that an excavation volume is small and an initial overflow discharge is high.

Further, the step of (S5) comprises laying the steel flexible net at an upstream slope of the barrier dam, and embedding the two sides of the steel flexible net into a slope body with the gravels of the barrier dam, wherein an embedded depth is the anti-slide embedded depth at the two sides of the steel flexible net.

Further, the steel flexible net comprises: a horizontal supporting rope group, a first side rope, a second side rope, a steel mesh, multiple energy dissipating devices and multiple anchors; all of the steel mesh, the horizontal supporting rope group, the first side rope and the second side rope are made of steel with a strength of 1770 MPa.

Further, the horizontal supporting rope group comprises an upper support rope, a lower support rope and multiple middle support ropes; the upper support rope, the lower support rope, the first side rope and the second side rope define a boundary of the steel flexible net.

Further, the upper support rope, the lower support rope and each of the middle support ropes of the horizontal supporting rope group are all connected with a plurality of energy dissipating devices for providing large deformation at meter level to reduce the structural internal force of the steel flexible net, instead of dissipating water flow energy.

Further, the steel mesh is a rhombic or ring mesh and is able to be arbitrarily cut and stitched through shackles; the steel mesh, the upper support rope, the lower support rope, the first side rope and the second side rope are connected with each other through the shackles as a whole, while the multiple middle support ropes pass through multiple openings of the steel mesh, respectively.

Further, the steel mesh has the openings each of which has a diameter in a range of 100 to 300 mm. The water permeability of the steel mesh is reduced by intercepting debris such as drift woods and leaves in the dammed lake, so as to control the flow into the channel and limit flow rate growth.

The method provided by the present invention has some advantages as follows.

(1) The steel flexible net is laid on the upstream slope of the barrier dam; due to the blocking of debris such as drift woods and leaves intercepted by the steel mesh, the discharge of lake water flowing into the channel is able to be directly controlled, and the flow rate growth thereof is limited; compared with the artificial structure installed at the midstream and downstream of the channel, the steel flexible net provided by the present invention is able to effectively control the undercut of the channel.

(2) The steel flexible net is manufactured by weaving high-strength steel wires, which is convenient to obtain raw materials; light in structure, limited in the total weight, able to be transported by helicopter, thereby eliminating the need to construct the temporary access roads in the mountainous area.

(3) The steel flexible net is able to be arbitrarily cut and stitched, which is high in flexibility, so that it is able to be applied to varying scales and terrains of different barrier dams.

(4) When the structural internal force of the steel flexible net is too large, the energy dissipating devices and the steel flexible net embedded into the slope body are able to slide, causing large deformation without destroying the integrity of the steel flexible net, so that the automatic adjustment of the structural internal force of the steel flexible net is achieved, the steel flexible net has good resilience and deformation characteristics; moreover, the structural internal force is able to be calculated through the deformation for preventing catastrophic consequences of sudden structural failure.

BRIEF DESCRIPTION OF THE DRAWINGS

In FIGS. 4 and 5, h is an anti-slide embedded depth, $\theta$ is a slope angle, p is a uniform pressure, d is a distance between two adjacent support ropes, pd is line load of water flow applying to any one support rope of the horizontal supporting rope group, T is a tensile force of any one support rope of the horizontal supporting rope group, r is a radius of an arc, s is an arc length of the arc, l is a width of the channel, $\alpha$ is half of an angle corresponding to the arc length s.

DETAILED DESCRIPTION OF THE PREFERRED EMBODIMENT

The present invention is further explained in detail with accompanying drawings and embodiments as follows.

Figure 1:
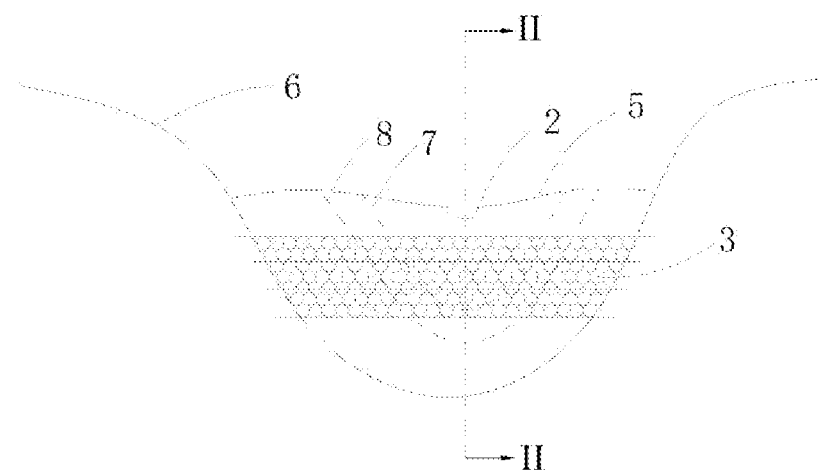
FIG. 1 is a front view of a steel flexible net and a barrier dam with mountains at two sides of the steel flexible net according to a preferred embodiment of the present invention.
Figure 2:
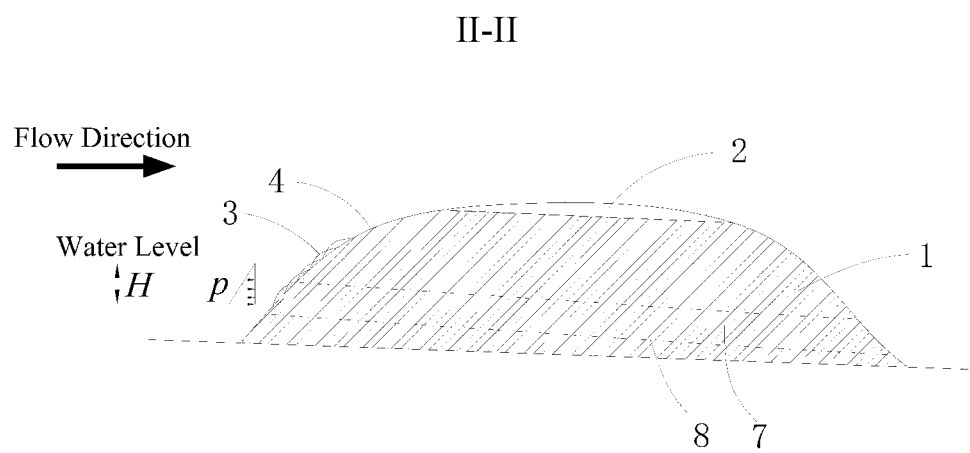
FIG. 2 is a sectional view of the steel flexible net and the barrier dam along II-II direction in FIG. 1 according to the above preferred embodiment of the present invention, wherein the mountains at the two sides of the steel flexible net are not shown.

Referring to FIG. 2 of the drawings, a steel flexible net 3 is laid on an upstream slope 4 of a barrier dam 1 for cooperating with a manually excavated channel 2. Since the initial discharge flow is small, no regulation on the discharge is required. Accordingly, as shown in FIG. 1, the steel flexible net 3 is laid below the channel 2, a relative distance therebetween is determined by the flood peak discharge that the downstream is able to bear. The channel 2 is excavated from a lowest point of a transverse cross section 5 of the barrier dam 1. During the discharge, the channel 2 gradually undercuts and laterally expands to a cross section 7 at peak discharge and a maximum cross section 8 when the discharge diminishes. The steel flexible net 3 stretches across the maximum cross section 8 of the channel 2.

Figure 3:
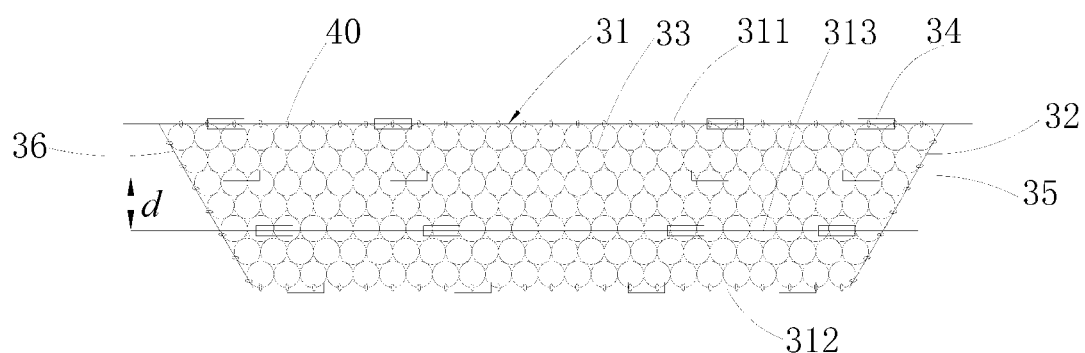
FIG. 3 is a structural schematic vies of the steel flexible net.

Referring to FIG. 3 of the drawings, the steel flexible net 3 comprises a horizontal supporting rope group 31; a first side rope 32, a second side rope 36, a steel mesh 33; multiple energy dissipating devices 34 and anchors 35; the horizontal supporting rope group 31 comprises an upper support rope 311, a lower support rope 312 and multiple middle support ropes 313; the upper support rope 311, the lower support rope 312, the first side rope 32 and the second side rope 36 define a boundary of the steel flexible net 3. All of the steel mesh 33, the horizontal supporting rope group 31, the first side rope 32 and the second side rope 36 are prepared by weaving steel wires with a strength of 1770 MPa.

The upper support rope 311, the lower support rope 312 and each of the middle support ropes 313 of the horizontal supporting rope group 31 are all connected with a plurality of energy dissipating devices 34 for providing large deformation at meter level to reduce a structural internal force of the horizontal supporting rope group 31, instead of dissipating water flow energy.

The steel mesh 33 is a rhombic or ring mesh and is able to be arbitrarily cut and stitched through shackles. The steel mesh 33, the upper support rope 311, the lower support rope 312, the first side rope 32 and the second side rope 36 are connected with each other through the shackles 40 as a whole, while the multiple middle support ropes 313 pass through multiple openings of the steel mesh 33, respectively, so as to adapt to varying scales and terrains of different barrier dams 1. The steel mesh 33 has the multiple openings each of which has a diameter in a range of 100 to 300 mm. The water permeability of the steel mesh 33 is reduced by intercepting debris such as drift woods and leaves in the dammed lake, so as to control the water flow flowing into the channel and limit flow rate growth.

Figure 4:
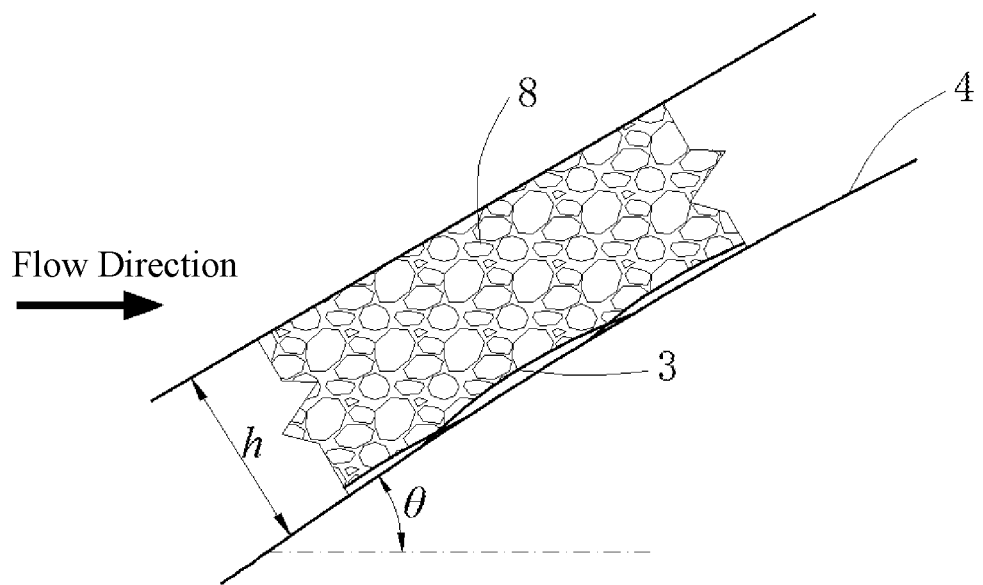
FIG. 4 is a schematic view of the embedded steel flexible net by gravels.

Referring to FIG. 4 of the drawings, two sides of the steel flexible net 3 are embedded into a slope body with gravels 8 of the barrier dam 1, for increasing the overall anti-slip resistance; if necessary, an anti-slide embedded h at the two sides of the steel flexible net 3 is able to be increased during the breaching process to further increase the anti-slip resistance. Moreover, through the anchors 35 which are connected with two ends of the horizontal supporting rope group 31, the two sides of the steel flexible net 3 are able to be anchored to a stable mountain 6 or big boulders. However, it should be noted that the anchors 35 are not necessary for the present invention.

Figure 5:
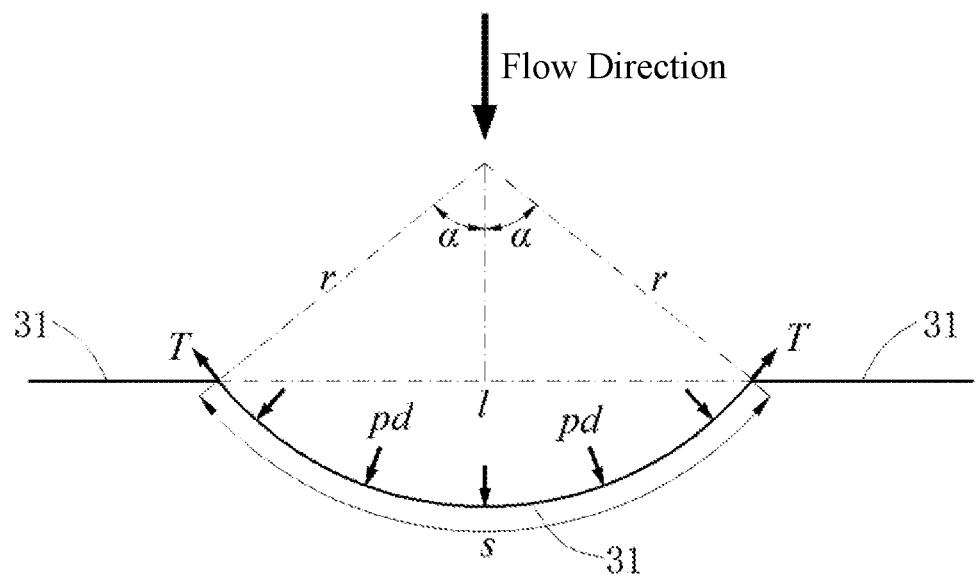
FIG. 5 is a force analysis diagram of any one support rope of the horizontal supporting rope group within the width of the channel.

Referring to FIG. 5 of the drawings; under the action of the uniform line load pd of lake water, any one support rope of the horizontal supporting rope group 31 within a width/of the channel 2 and the multiple energy dissipating devices 34 which are connected with the horizontal supporting rope group 31 will undergo a large deformation, forming an arc with an angle of 2α and a radius of r. A tensile force T of any one support rope of the horizontal supporting rope group 31 is in equilibrium with the uniform line load pd, and is further transmitted to the portion that the two sides of the steel flexible net 3 are embedded by the gravels 8.

A method for regulating and controlling discharge flow of dammed lake comprises steps of:

(S1) estimating a most dangerous discharge condition, which comprises: through Dam Break Flood Analysis Software V2.0, which is abbreviated as DB-IWHR with a registration number of 2019SR1035751, in an absence of the steel flexible net 3, calculating a flood peak discharge when the barrier dam 1 discharges, a cross section 7 of the channel 2 corresponding to the flood peak discharge, and a maximum cross section 8 of the channel 2 when discharge diminishes, wherein an embedded range of the steel flexible net 3 is an upstream slope of the barrier dam 1 between the maximum cross section 8 of the channel 2 and the stable mountain 6 at the two sides of the steel flexible net 3, referring to FIG. 1;

since the discharge is suppressed when the steel flexible net 3 is installed, the undercut of the channel 2 is correspondingly more moderate, that is, the most dangerous discharge condition corresponds to that the steel flexible net 3 is not installed; the following calculations take the width of the channel 2 and the water level of the dammed lake 1 as calculation parameters under an condition of not installing the steel flexible net 3;

(S2) calculating a structural internal force of the steel flexible net 3, wherein: due to the blocking of debris such as drift woods and leaves intercepted by the steel mesh 33, the discharge of dammed lake water flowing through the steel flexible net 3 is low, it is assumed here that a pressure applying to the steel flexible net 3 is a hydrostatic pressure, and a depth from one support rope of the horizontal supporting rope group 31 to a free surface is then a uniform pressure p corresponding to the depth H is expressed by a formula of:

$$p = \rho_w g H \quad (1),$$

here, $\rho_w$ is water density, g is acceleration of gravity;

under the action of the uniform pressure p, a shape of the one support rope is an arc with an arc length s of:

$$s = \frac{2\alpha}{180}\pi r, \quad (2)$$

here, α is half of an angle corresponding to the arc length s (system of degree measure), r is a radius of the arc; on the other hand, considering the deformation of the energy dissipating devices 34, a sum of the width l of the channel 2 and elongation of the one support rope is the arc length s and is expressed by a formula of:

$$s = l + \frac{nT}{k} = l + \frac{npdr}{k}, \quad (3)$$

here, T is a tensile force of the one support rope, pd is a line load of the uniform to pressure p applying to the steel mesh 33 concentrated on the horizontal supporting rope group 31, d is a distance between two adjacent support ropes among the horizontal supporting rope group 31, d/2 is used instead of d for the upper support rope 311 and the lower support rope 312, k is a stiffness of the energy dissipating devices 34, n is a quantity of the energy dissipating devices 34 within the width l of the channel 2;

the width l of the channel 2 and the radius r of the arc satisfy a trigonometric function of:

$$\sin\alpha = \frac{l}{2r}, \quad (4)$$

the stiffness k, the quantity n and the width l of the channel 2 are taken as constants and the line load pd is taken as an independent variable, so that the angle α and the radius r are solved according to the formulae (2) to (4), and then the tensile force T of the one support rope of the horizontal supporting rope group 31 is obtained by a formula of:

$$T = pdr \quad (5),$$

it is able to be seen that when the energy dissipating devices 34 are deformed, the horizontal supporting rope group 31 is elongated and the radius r is reduced, which is helpful to reduce the tensile forces T of the horizontal supporting rope group 31; on the other hand; the sliding of the embedded portion, that the two sides of the steel flexible net 3 are embedded, also helps to reduce the tensile forces T of the horizontal supporting rope group 31;

(S3) calculating an anti-slide embedded depth at the two sides of the steel flexible net 3, wherein: when a transverse force F caused by water flow is applied to the two sides of the steel flexible net 3 embedded into the gravels 8, a sliding criterion is expressed by a formula of:

$$F = (\rho_s g h \cos\theta) A \tan\varphi \quad (6),$$

here, $\rho_s$ is a density of the gravels 8, generally 1400-1600 kg/m³ above water and 1000 kg/m³ below water, h is the anti-slide embedded depth, A is an embedded area at one side of the steel flexible net 3, θ is a slope angle, φ is a friction angle within the gravels 8 and generally 30°; the transverse force F is equal to a total force of the tensile forces T of all m support ropes immersed in water, so that the anti-slide embedded depth h is reversed by a formula of:

$$h = \frac{T_1 + T_2 + \ldots T_m}{(\rho_s g \cos\theta) A \tan\varphi}; \quad (7)$$

(S4) manually excavating the channel 2, wherein the channel 2 is manually excavated at a low-lying place of the barrier dam 1 for ensuring that an excavation volume is small and an initial discharge is high; and (S5) embedding the steel flexible net 3, which comprises: laying the steel flexible net 3 at the upstream slope of the barrier dam 1, wherein the two sides of the steel flexible net 3 are embedded into the slope body with the gravels S of the barrier dam 1 for enhancing the overall anti-slip resistance, the embedded depth h is determined by the step of (S3); when necessary, the embedded depth at the two sides is increased during the breaching process to further increase the anti-slip resistance; moreover, through the anchors 35 which are connected with the two ends of the horizontal supporting rope group 31, the two sides of the steel flexible net 3 are anchored to the stable mountain 6 or big boulders.

Since the initial discharge flow is small, no regulation is required, and the steel flexible net 3 is laid under the channel 2, and the relative distance therebetween is determined by the flood peak discharge that the downstream is able to bear.

What is claimed is:

1. A method for regulating and controlling discharge flow of a dammed lake with a steel flexible net, which comprises steps of:
   (S1) estimating a peak discharge condition;
   (S2) based on the peak discharge condition, calculating a structural internal force of the steel flexible net;
   (S3) based on the structural internal force of the steel flexible net, calculating an anti-slide embedded depth at two sides of the steel flexible net;
   (S4) based on the peak discharge condition, manually excavating a channel; and
   (S5) based on the anti-slide embedded depth at the two sides of the steel flexible net, embedding the steel flexible net into a barrier dam.

2. The method, as recited in claim 1, wherein: the step of (S2) comprises calculating a uniform pressure of the steel flexible net under hydrostatic condition, wherein the steel flexible net comprises a horizontal supporting rope group and multiple energy dissipating devices connected with the horizontal supporting rope group; calculating an arc length of an arc which is formed by the horizontal supporting rope group under the uniform pressure; according to a deformation of the energy dissipating devices, a width of the channel and the uniform pressure, calculating a radius of the arc; and according to the uniform pressure and the radius of the arc, calculating a tensile force of the horizontal supporting rope group.

3. The method, as recited in claim 1, wherein: the step of (S3) comprises assuming a tensile force of a horizontal supporting rope group caused by water flow is further transferred to the two sides of the steel flexible net which are embedded into gravels, and reversing the anti-slide embedded depth.

4. The method, as recited in claim 1, wherein: the step of (S4) comprises manually excavating the channel at a low-lying place of the barrier dam.

5. The method, as recited in claim 1, wherein: the step of (S5) comprises laying the steel flexible net at an upstream slope of the barrier dam, and embedding the two sides of the steel flexible net into a slope body with gravels of the barrier dam, wherein an embedded depth is the anti-slide embedded depth at the two sides of the steel flexible net.

6. The method, as recited in claim 1, wherein: the steel flexible net comprises: a horizontal supporting rope group, a first side rope, a second side rope, a steel mesh, multiple energy dissipating devices and multiple anchors; all of the steel mesh, the horizontal supporting rope group, the first side rope and the second side rope are made of steel with a strength of 1770 MPa.

7. The method, as recited in claim 6, wherein: the horizontal supporting rope group comprises an upper support rope, a lower support rope and multiple middle support ropes; the upper support rope, the lower support rope, the first side rope and the second side rope define a boundary of the steel flexible net.

8. The method, as recited in claim 7, wherein: the upper support rope, the lower support rope and each of the middle support ropes of the horizontal supporting rope group are all connected with a plurality of energy dissipating devices.

9. The method, as recited in claim 6, wherein: the steel mesh is a rhombic or ring mesh and is able to be arbitrarily cut and stitched through shackles;
the steel mesh, the upper support rope, the lower support rope, the first side rope and the second side rope are connected with each other through the shackles as a whole, while the multiple middle support ropes pass through multiple openings of the steel mesh, respectively.

10. The method, as recited in claim 9, wherein the steel mesh has the multiple openings each of which has a diameter in a range of 100 to 300 mm.

\* \* \* \* \*